United States Patent [19]

Cullen et al.

[11] 4,100,811

[45] Jul. 18, 1978

[54] DIFFERENTIAL SURFACE ACOUSTIC WAVE TRANSDUCER

[75] Inventors: Donald E. Cullen, Manchester; Thomas M. Reeder, Glastonbury, both of Conn.

[73] Assignee: United Technologies Corporation, Hartford, Conn.

[21] Appl. No.: 779,106

[22] Filed: Mar. 18, 1977

[51] Int. Cl.² .............................................. G01L 1/16
[52] U.S. Cl. ...................... 73/654; 73/609; 73/658; 73/DIG. 4
[58] Field of Search ................ 73/71.2, 67.5 R, 71.4, 73/398 R, 67.6, DIG. 4, 88 R; 333/30 R; 310/8.1

[56] References Cited

U.S. PATENT DOCUMENTS

| 3,858,064 | 12/1974 | Schissler ........................ 73/DIG. 4 |
| 3,878,477 | 4/1975 | Dias et al. ....................... 73/DIG. 4 |
| 3,940,636 | 2/1976 | Perahia ........................ 333/30 R X |

*Primary Examiner*—Jerry W. Myracle
*Attorney, Agent, or Firm*—M. P. Williams

[57] ABSTRACT

A diaphragm formed in a substrate and having a piezoelectric surface includes a first surface acoustic wave (SAW) delay line disposed on said surface and connected in an oscillator circuit for a significant frequency sensitivity to surface strain of said diaphragm, and a second, similar oscillator with the SAW delay line thereof connected for a significant frequency sensitivity to surface strain of the diaphragm opposite in sense to that of the first oscillator, and a mixer for providing the difference in the frequencies of the two oscillators, whereby the overall sensitivity to strain is enhanced, while at the same time the sensitivity to temperature variations is reduced significantly through subtractive combination.

2 Claims, 4 Drawing Figures

U.S. Patent     July 18, 1978     4,100,811
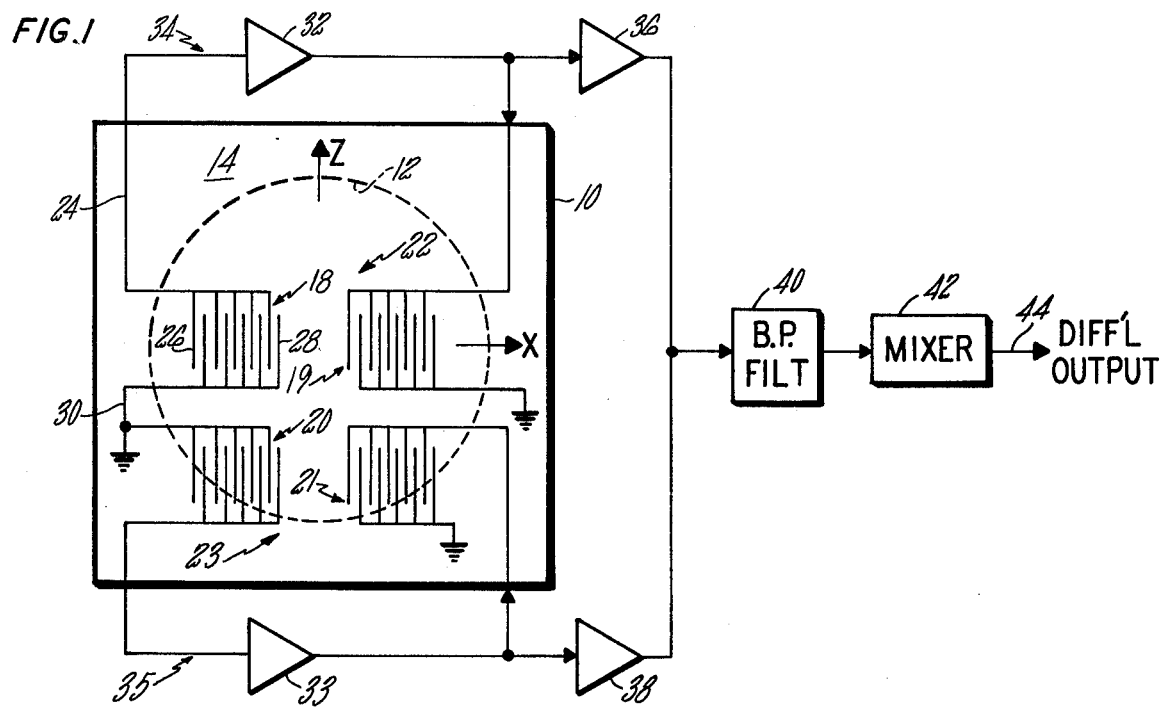
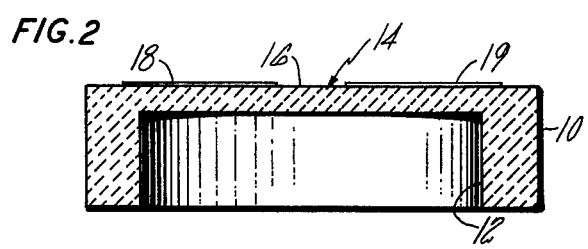
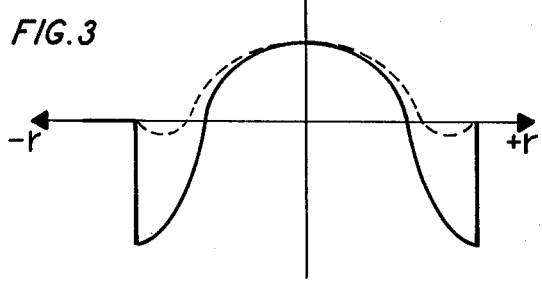
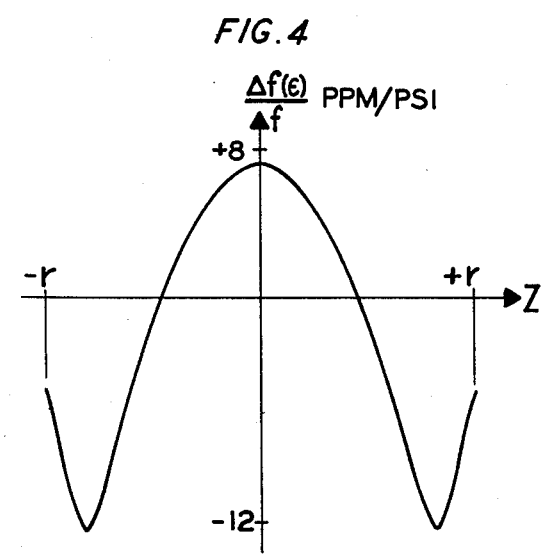

DIFFERENTIAL SURFACE ACOUSTIC WAVE TRANSDUCER

The invention disclosed herein was made in the course of or under a contract with the Department of the Navy.

FIELD OF ART

This invention relates to surface acoustic wave transducers, such as pressure transducers, and more particularly to increased strain sensitivity and decreased temperature sensitivity thereof.

BACKGROUND OF THE INVENTION

As is known in the art, surface acoustic wave (SAW) devices may be utilized to measure parameters which are proportional to strain induced in the devices by means of the coupling of the mechanical strain to the electric, surface wave properties of the devices. Specifically, the propagation velocity of a surface acoustic wave, and the length of the propagation path of a SAW delay line, are both functions of strain in the surface; thus, the operating frequency of a SAW delay line depends on strain in the surface thereof.

For instance, many piezoelectric materials such as quartz, lithium niobate, lithium tantalate, etc., exhibit the requisite acousto-electric coupling to provide a measurable variation in surface acoustic wave propagation velocity in response to variations in the subsurface strain thereof; additionally, composite treated substrates, such as silicon, having a suitable thin film coating of piezoelectric material, such as zinc oxide, exhibit the requisite piezoelectric characteristic for use in SAW transducers.

Any sort of strain-related phenomena such as temperature, stress, acceleration and other similar mechanical parameters, can be measured by suitably arranged SAW transducers employing a deformable piezoelectric material. Although the invention is not so limited, for simplicity in the dicussion herein, the following description is limited to pressure transducers in which the pressure difference across a piezoelectric diaphragm is measured through the variation in frequency of an oscillator including a SAW delay line on the surface of the diaphragm.

A variety of surface acoustic wave transducers are disclosed in U.S. Pat. No. 3,978,731. Therein, the strain responsive member, the mechanical effects of which are to be measured by the SAW delay lines, may comprise a diaphragm formed by removal of suitable material from a bulky substrate. The transducers disclosed in the aforementioned patent provide SAW delay lines on surfaces of that portion of the bulky material beyond the diaphragm, rather than on a surface of the diaphragm itself. It is believed that the summation of strain effects on wave propagation velocity across the entire diaphragm tend to sum vectorily to a small value, which value may provide so low a sensitivity as to render such devices impractical. It is also believed that the sensitivity of such devices to temperature variations may far exceed the sensitivity thereof to strain variations, and therefore mask the phenomena, such as pressure on the diaphragm, which is to be measured. As an improvement of such devices, U.S. Pat. No. 3,863,497 teaches mounting of the surface acoustic wave transducers on a surface of the diaphragm itself, rather than over the bulky substrate material. However, a SAW pressure transducer of the type described may have a frequency dependence on temperature of on the order of 20 or 30 parts per million per degree centigrade, whereas the strain sensitivity of frequency may be only about 6 or 8 parts per million per psi. Differential SAW transducers are known, such as in U.S. Pat. No. 3,848,144, and U.S. Pat. No. 3,863,497 (referred to hereinbefore), in which SAW delay lines are mounted on opposite sides of a piezoelectric wafer; but these do not lend themselves to practical, stable devices, particularly for sensing pressure and the like.

SUMMARY OF THE INVENTION

Objects of the present invention include provision of increased sensitivity in surface acoustic wave transducers and reduction of temperature sensitivity in surface acoustic wave transducers.

According to the present invention, a surface acoustic wave (SAW) transducer, of the type in which strain effects are acousto-electrically coupled to an oscillator by a SAW delay line (on a piezoelectric surface), includes a pair of SAW delay lines disposed with respect to the strain sensitive portion of a single surface of said transducer so that the frequency sensitivity to strain of one of said delay lines is opposite in sense to the frequency sensitivity to strain of the other of said delay lines, each of said delay lines being disposed in a respective oscillatory loop, the frequencies of said loops being subtractively combined. According further to the invention in one form, a SAW transducer includes a diaphragm formed within a bulk substrate, with two SAW delay lines disposed on the surface of the diaphragm, said delay lines being disposed for opposite frequency sensitivity to strain in said diaphragm.

In further accord with the present invention, a SAW pressure transducer includes separate SAW delay lines mounted on the same surface of a diaphragm in a manner to couple strain effects to one of said delay lines in the opposite sense to the strain effects coupled to the other of said delay lines.

In accordance with the present invention, a pair of SAW oscillators are coupled to the same surface of an acousto-electric diaphragm for opposite sensitivity to pressure thereon, and the outputs thereof are subtractively combined so as to provide a differential output.

The present invention, by combining the sensitivities of two SAW oscillators, increases the sensitivity of a SAW transducer. By combining the outputs subtractively, the sensitivity of such devices to temperature is reduced by several orders of magnitude. Provision of differentially-operated SAW delay lines on the same surface of the transducer is particularly useful in pressure transducers. The present invention may be implemented utilizing SAW technology which is known in the art, to provide highly sensitive transducers having improved temperature stability; the transducers in accordance herewith are readily reproducible for practical utilization.

The foregoing and various other objects, features and advantages of the present invention will become more apparent in the light of the following detailed description of preferred embodiments thereof, as illustrated in the accompanying drawing.

DESCRIPTION OF THE DRAWING

FIG. 1 is a simplified, schematic block diagram of a circuit, including a top plan view of a SAW device, in accordance with the present invention;

FIG. 2 is a simplified, sectioned side elevation view of the SAW device of FIG. 1;

FIG. 3 is an illustration of strain in the SAW device of FIGS. 1 and 2; and

FIG. 4 is an illustration of the effect on frequency of strain in the SAW device of FIGS. 1 and 2.

DETAILED DESCRIPTION

Referring now to FIGS. 1 and 2, a surface acoustic wave transducer in accordance with the present invention is formed on a suitable substrate, such as a substrate 10 of piezoelectric material or a nonpiezoelectric substrate having a thin film surface coating that provides acousto-electrical coupling, as described hereinbefore. The substrate 10 has a circular void 12 (of radius $r$) therein so as to form a diaphragm 14 having a surface 16 on which a plurality of SAW transducers, referred to herein as acousto-electric couplers, or more simply "couplers" 18–21, are disposed. The couplers 18, 19 are separated by a span of surface to form a delay line 22, and the couplers 20, 21 are separated by a span of surface to form a delay line 23. Each of the couplers is of the well known interdigital type in which a first electrical circuit, such as the circuit 24, includes "fingers" 26, which are interspersed with "fingers" 28 connected to a second circuit 30. The spacing between each finger 26 and adjacent finger 28 is half a wavelength as is known in the art. These provide acousto-electric coupling between the electrical circuit 24 and a surface wave in the surface 16 to form a SAW delay line. But, if desired, each of the fingers 26, 28 may alternatively comprise a pair of side by side fingers, each pair separated by $\frac{1}{8}$ wavelength, the pairs relating to one circuit 24 being interspersed between the pairs relating to the other circuit 30, with a separation of substantially one wavelength between adjacent pairs of the same circuit and a half wavelength between the centroids of the pairs of different circuits, as is known in the art. A pressure differential across the diaphragm 14 will stress the diaphragm so as to induce strains therein, which strains affect the propagation velocity of surface waves acousto-electrically coupled to the circuit by the couplers 18, 19. Each of the delay lines 22, 23 is connected in an oscillatory loop including a related amplifier 32, 33 to form a corresponding oscillator 34, 35. Each oscillator 34, 35 sustains oscillations at the resonant frequency of the loop, which is controlled in substantial part by the frequency of maximum coupling of the related SAW delay line 22, 23, which in turn is controlled in part by the interdigital spacing of the fingers 26, 28 and in part by the span between related couplers 18, 19.

The output of each oscillatory circuit is coupled through a related buffer amplifier 36, 38 and, if desired, through a band pass filter 40 to a mixer 42 which, as in common VHF telecommunications technology, is selected to have a significant difference frequency component, thereby to provide a differential output on a line 44 (not unlike the IF frequency provided by a mixer in the telecommunications art). The band pass filter 40 simply enhances overall system response with respect to the desired frequencies, eliminating additional noise, as is known in the art.

Referring now to FIG. 3, a qualitative illustration of radial strain across the diameter of the diaphragm 14, represented by the solid line 46, shows that the sense of the radial strain near the center of the diaphragm is opposite to the sense of the radial strain near the periphery thereof, there being substantially no strain in the bulky material of the substrate 10 beyond the void 12. Also illustrated, by a dotted line 48 in FIG. 3, is the fact that circular strain is substantially more predominant in the center, is null at the periphery, and has slight negative components near the periphery.

One of the characteristics of strain in a propagation medium is its effects on the propagation velocity of a surface wave therein, there being, as understood, resolvable components of strain effects which are both parallel with and perpendicular to the propagation of the surface acoustic wave. The strain effects relevant to operation of SAW transducers vary in different piezoelectric materials. For example, in Y-cut quartz, the propagation velocity of a surface wave propagating in the X direction is highly sensitive to strain effects in the Z direction (perpendicular to the direction of wave propagation) and is also somewhat less sensitive to strain effects in the X direction (parallel with the wave propagation direction). Another effect of strain parallel to the wave propagation is simply the change in mechanical length of the span between couplers, the interdigital finger spacing, which alters the path length and thus the wave propagation time, as a consequence of stretching accompanying tensile strain, or of shrinking accompanying compressive strain. For all practical purposes, the effective path length may be assumed to be the distance between centroids of the delay line couplers. The parallel strain path length effects are opposite in sense to the parallel strain wave velocity effects. In FIG. 3, the positive strain is tensile (yielding a higher frequency in Y-cut quartz) and the negative strain is compressive (yielding a lower frequency in Y-cut quartz). But the delay lines 22, 23 are responsive to the components perpendicular and parallel to wave propagation, of the total strain, including both the radial and circular components thereof.

In a qualitative fashion, and ignoring small strain effects such as that accompanying strains normal to the surface (which could result from pressure on the surface), shear strains, and the depth gradient of strain (which is maximum and of opposite sense on opposite surfaces and zero in the middle), the frequency sensitivity of a SAW delay line to strain can be qualitatively expressed in terms of the differential change in strain parallel to the path of propagation, which includes both length and velocity effects which are opposite to each other, and differential changes in strain perpendicular to the direction of wave propagation, which is only a velocity effect. Thus for the SAW delay line 22, there are significant frequency effects responsive to strain components both parallel and perpendicular to the wave propagation. On the other hand, however, there are substantially no parallel strain components in the area of propagation of the SAW delay line 23 so that the frequency effects thereof are almost completely due to strains perpendicular to the wave propagation thereof.

Although these phenomena are not fully understood, it is believed that they are largely responsible for the overall frequency sensitivity to strain of SAW delay lines, which is qualitatively illustrated in FIG. 4 for a round, Y-cut quartz diaphragm, for a delay line oriented for wave propagation in the X direction, at different distances from the center thereof in the Z direction (up and down, as shown in FIG. 1).

FIG. 4 takes into account the effects on SAW delay line frequency resulting from strain induced in a circular diaphragm by a pressure difference across it, as illustrated in FIGS. 1 and 2, both types of strain resolved into components which are parallel to and perpendicular to the wave propagation direction, including both path length and wave velocity effects of strain in the parallel direction, and wave velocity effects of strain in the perpendicular direction. The net result, as illustrated in FIG. 4, is that a SAW delay line mounted across the center of the diaphragm 14 (such as the SAW delay line 22) has a substantial frequency dependence upon strain which is of opposite sense to a SAW delay line mounted substantially 4/5 of the distance from the center toward the periphery of the diaphragm 14, such as the SAW delay line 23. Thus it is apparent, according to the invention, that the difference in frequency response to strain between the two oscillators 34, 35 with their respective SAW delay lines 22, 23 disposed generally in the manner illustrated in FIG. 1, can be on the order of twice the frequency response of a single oscillator employing a single SAW delay line optimally disposed on such a diaphragm.

There is, however, a tendency for frequency locking as a result of coupling between the SAW delay lines 22, 23 which may be a consequence of surface wave coupling and/or coupling through electromagnetic radiation above the surface. However, it has been found that operation of the two oscillatory loops at slightly different frequencies avoids the tendency for frequency coupling sufficiently to permit optimum disposition of the delay lines 22, 23 on the surface 16. A phase change induced by the separation of related couplers 20, 21 in contrast to the separation between the other pair of couplers 18, 19, which is on the order of ½ to one wavelength induces a frequency difference between the two oscillators (of on the order of 50 KHz), which has been found to be adequate in a transducer operating in the 80 MHz regime. As is illustrated in FIG. 1, the half wavelength interdigital spacing can be employed to provide a suitable frequency difference between the two oscillatory loops so as to prevent frequency locking, simply by connecting one of them oppositely from the manner in which the other is connected. Thus, the SAW delay line 22 has its couplers 18, 19 connected in-phase, while the SAW delay line 23 has its couplers 20, 21 connected out-of-phase. The extra half-wavelength delay introduces a sufficient phase change to induce the requisite frequency shift. Other frequency-determining factors could be adjusted to effect the frequency shift to avoid locking, if desired.

The inter-coupler spacing of each SAW delay line 22, 23 may be adjusted in accordance with techniques known in the art. For instance, it is desirable to have each of the couplers of a given delay line disposed with respect to the same type of strain effects, rather than having it disposed over opposite effects which could cancel. Also, it is obvious that it is desired to have the delay lines 22, 23 mounted on the surface of the diaphragm 14 in such a fashion to be maximally responsive to strains in the diaphragm; thus the physical size of the diaphragm ordains a need for relatively close spacing of the couplers 18-21 of the two delay lines. If the couplers 18, 19 and 20, 21 of each delay line 22, 23 are coupled too closely together, then there is electromagnetic field coupling between the couplers of each delay line which swamps the surface wave frequency effects which are desired. If the couplers are spread too far apart, then the summation of the strain effects will be reduced. As an example, for Y-cut quartz having the delay lines 22, 23 oriented for wave propagation in the X direction of the quartz, inter-coupler spans on the order of 60 mils, with the spacing between the fingers 26, 28 of one of the couplers (such as the coupler 18) of about ¾ of a mil (for couplers having about 120 pairs of fingers), produces a device which operates in the 80 MHz regime. This is suitable for a pressure transducer formed with a 10-20 mil thick diaphragm having roughly ½ inch diameter, in a substrate 10 which may be on the order of ⅛ inch thick. Such a transducer, when suitably fitted into pressure tight enclosures, operates in the 0-50 psi regime quite well. Typically, the upper surface of the diaphragm 14 (as seen in FIG. 2) may be evacuated, so as to read absolute pressure, which is coupled in a suitable enclosure to the bottom on the diaphragm 14 (as seen in FIG. 2). Of course, the invention will work in a variety of pressure ranges, and in configurations other than as an absolute pressure measuring device. The dimensions and frequencies given herein are, of course, only indicative of the illustrative embodiment herein, and other choices may be made within the known surface acoustic wave technology.

The example herein is in Y-cut quartz cyrstal; however, the invention may be practiced with other known piezoelectric crystals, and with other cuttings, although the known SAW characteristics will dictate the most useful structures for a transducer in accordance with the invention. For instance, ST-cut quartz does not, in general, have high enough sensitivity of opposite sense to render it attractive for practice of the invention. Similarly, zinc oxide coated silicon is much less sensitive to the orientation of the delay lines thereon. In fact, all of the factors known in the surface acoustic wave art apply to the invention, in the same fashion as in the general SAW delay line art, and are not specific to the present invention.

Enhanced operation can be achieved by substituting SAW resonators for the SAW delay lines 22, 23 herein. As is known, the SAW resonators include a structure similar to a SAW delay line having surface propagation discontinuities placed on opposite sides of the SAW delay line (such as to the right and to the left of the delay line 22 as seen in FIG. 1). This tends to resonate the SAW action to provide a higher Q at the design frequency. The surface propagation discontinuity, as is known, can be formed by metalized lines on the surface, or grooves within the surface. All of this if irrelevant to the practice of the present invention, and the term delay line as used herein includes the delay lines within a surface resonator as well as those which are not included in a surface resonator.

Enhanced operation may also be provided, in some cases, by providing a different orientation of the couplers 18-21 with respect to each other, and with respect to the diaphragm 14. The advantages to be gained, however, are frequently difficult to achieve due to the finite width and length of the couplers 18-21, which reduces the ability to maximize certain, geographical effects in the transducer as a whole. Similarly, the strain effects described herein relating to a circular diaphragm 14 formed by a void 12 in a thicker material 10 are not critical to the invention; any diaphragm, which is herein defined as a strain responsive structure having piezoelectric characteristics, may be utilized in an embodiment of the invention, if desired. As is known, a surface acoustic wave travels in non-piezoelectric material, so only the surface below the couplers need be piezoelectric, to provide the acousto-electric coupling between the material and the circuits. Naturally, the positioning of the SAW delay lines 22, 23 with respect to each other, as well as their internal dimensional characteristics, will depend upon the particular strain-responsive surface with which the invention is to be practiced; these variations are accommodated by teachings which are well known in the surface acoustic wave art, in the light of the teachings herein.

Thus, although the invention has been shown and described with respect to exemplary embodiments thereof, it should be understood by those skilled in the art that the foregoing and various other changes, omissions and additions to the form and detail thereof may be made therein and thereto, without departing from the spirit and the scope of the invention.

Having thus described typical embodiments of our invention, that which we claim as new and desire to secure by Letters Patent of the United States is:

1. A differential surface acoustic wave transducer for measuring a parameter, the effects of which induce strain in a piezoelectric diaphragm, the combination with said diaphragm, comprising:
   a plurality of surface acoustic wave delay lines disposed on a single surface of said diaphragm at positions thereon which provide substantial control over the wave propagation velocity of the surface acoustic wave in each delay line, the sense of said control in one of said delay lines being opposite to the sense of said control in another of said delay lines;
   a plurality of amplifiers, one for each of said delay lines, each having an input and an output, each of said delay lines connected from the output of a corresponding one of said amplifiers to the input thereof in feedback relationship so as to form an oscillator, the output of which is at a natural frequency of the related one of said delay lines and varies as a function of strain in said diaphragm in a manner opposite to another one of said oscillators; and
   means for mixing the outputs of said oscillators to provide a difference frequency which is a function of the response of all of said delay lines to the strain in said diaphragm.

2. A differential surface acoustic wave oscillator for measuring a parameter capable of inducing strain, comprising:
   a piezoelectric diaphragm having a principal surface;
   a pair of oscillators, each of said oscillators including an amplifier and a surface acoustic wave delay line connected in feedback relation with said amplifier, said delay lines formed at respective portions of said surface so that each of said oscillators has a frequence dependent on strain of the related portion of said diaphragm which is opposite in sense to that of the other of said oscillators; and
   mixing means for providing as an output of said transducer the frequency difference between said oscillators, whereby the sensitivity of said transducer to strain is greater than that of either of said oscillators and the sensitivity in frequency of each of said oscillators to temperature is substantially canceled by said mixing means.

* * * * *

UNITED STATES PATENT AND TRADEMARK OFFICE
CERTIFICATE OF CORRECTION

PATENT NO. : 4,100,811
DATED : July 18, 1978
INVENTOR(S) : Donald E. Cullen and Thomas M. Reeder It is certified that error appears in the above-identified patent and that said Letters Patent are hereby corrected as shown below:

Column 6, line 21   "cyrstal" should read --crystal--

Column 6, line 44   "metalized" should read --metallized--

Column 6, line 45   "if" should read --is--

Column 8, line 21   "frequence" should read --frequency--

Signed and Sealed this

Sixth Day of March 1979

[SEAL]

Attest:

RUTH C. MASON
Attesting Officer

DONALD W. BANNER
Commissioner of Patents and Trademarks